(No Model.)
H. H. KENDRICK.
FRICTIONAL GRIP CLUTCH.
No. 434,934. Patented Aug. 26, 1890.
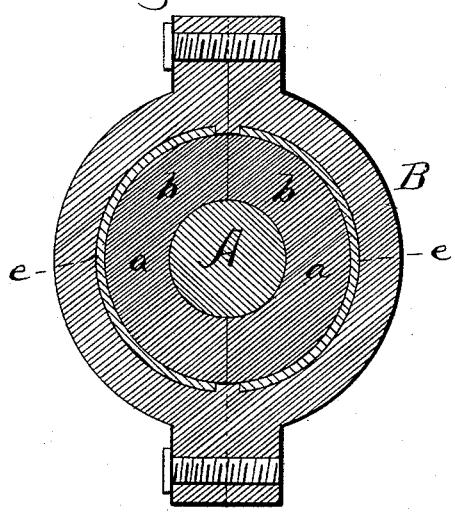
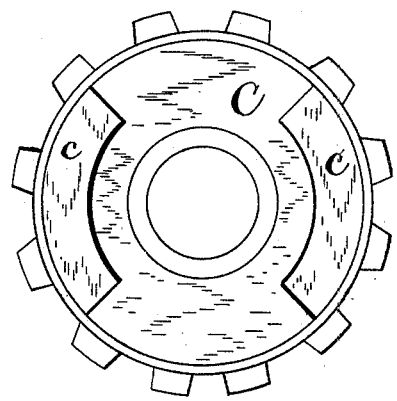
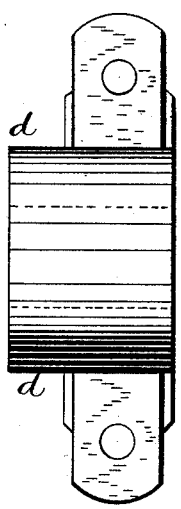
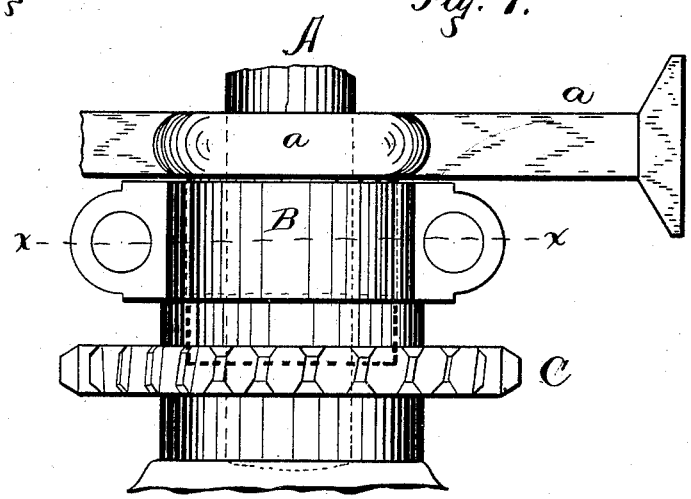
Witnesses
H. P. Denison
H. W. Clay
Inventor.
Hiland H. Kendrick
By his Attorneys
Smith & Denison

UNITED STATES PATENT OFFICE.

HILAND H. KENDRICK, OF FULTON, NEW YORK.

FRICTIONAL GRIP-CLUTCH.

SPECIFICATION forming part of Letters Patent No. 434,934, dated August 26, 1890.

Application filed November 26, 1889. Serial No. 331,671. (No model.)

*To all whom it may concern:*

Be it known that I, HILAND H. KENDRICK, of Fulton, in the county of Oswego, in the State of New York, have invented new and useful Improvements in Frictional Grip-Clutches, of which the following, taken in connection with the accompanying drawings, is a full, clear, and exact description.

My invention relates to bearings for fly-wheels, pulleys, &c., and especially to that class where it is desirable to relieve working parts of a machine from excess of strain and breakage whenever a working part encounters an object causing a sudden stoppage of that particular part, so as to ease down the momentum of each fly-wheel or drive-pulley.

My object is to produce a friction grip-clutch which will constitute a slip-connection between a shaft and a drive-pulley or fly or balance wheel thereon, which in ordinary use will not slip, but which will permit the slipping of such wheel upon the shaft whenever any obstacle creates a sudden stoppage of any working parts of a machine, and by such slipping or rotation of such wheel upon its shaft will ease off the sudden excess of strain down to a safe point without breakage.

My invention consists in the several novel features of construction and operation which are hereinafter described, and specifically set forth in the claim hereto annexed.

It is constructed as follows, reference being had to the accompanying drawings, in which—

Figure 1 is a top plan showing a shaft, a fly-wheel, my slip-clutch, and a sprocket or other pulley driven by the wheel. Fig. 2 is a plan view of one of the collar-sections. Fig. 3 is a plan view of the inner face of the sprocket or pulley. Fig. 4 is a vertical transverse section on line *x x*, Fig. 1.

A is the main shaft, upon which the fly-wheel or drive-pulley *a* is mounted loosely. The hub *b* of this fly-wheel is elongated inwardly, so that the sections of the collar B will fit over it.

Upon the outer end of the shaft I secure a sprocket or other pulley C, for transmitting power from the shaft. The inner face of this sprocket is provided with recess *c* in its outer face. Each of the collar-sections is provided with a flange *d* of proper form and size to fit into one of the recesses *c*, and thus create a rigid clutch-connection between the journal-box and the sprocket. I show this as one of the many rigid connections which may be made between the collar and sprocket or other pulley. The inner concaved face of each collar-section is recessed for substantially its whole length surface, and in each recess I place a leather packing *e*, which bears upon the periphery of the hub *b* when the sections are in place thereon, embracing it and holding it by frictional contact and with sufficient grip to transmit power from the sprocket to the fly-wheel, or vice versa, when the box bolts are tightened up.

It will be observed that when any working part of the machine is suddenly obstructed in its operation so as to wholly or partially stop the machine the momentum of the wheel *a* will temporarily break the grip of the collar upon the hub *b*, and the hub will slip until the momentum is reduced, so that the breaking strain upon the working parts is overcome, and, in fact, the whole machine stops. Then when the machine is again started the frictional grip of the box upon the hub has reasserted itself, and the fly-wheel, sprocket, and shaft again revolve together as though all one piece.

It will be observed that instead of the sprocket I can use a recessed collar with the same effect.

What I claim, and desire to secure by Letters Patent, is—

A friction grip-clutch comprising a main shaft, a pulley secured thereon and provided with recesses in its inner face, a fly or other wheel loose upon said shaft, and a collar provided with friction-packing and embracing the hub of the wheel and with projections fitting into the recess in the pulley, in combination, as set forth.

In witness whereof I have hereunto set my hand this 29th day of October, 1889.

HILAND H. KENDRICK.

In presence of—
H. P. DENISON,
ARVIN RICE,
EMMA COATES.